US006832619B1

(12) United States Patent
Walsh

(10) Patent No.: US 6,832,619 B1
(45) Date of Patent: Dec. 21, 2004

(54) METHOD TO REDUCE FLOW FORCES IN HYDRAULIC VALVES

(75) Inventor: Enda M. Walsh, Castlebar (IE)

(73) Assignee: Woodward Governor Company, Rockford, IL (US)

( * ) Notice: Subject to any disclaimer, the term of this patent is extended or adjusted under 35 U.S.C. 154(b) by 0 days.

(21) Appl. No.: 10/629,437

(22) Filed: Jul. 29, 2003

Related U.S. Application Data

(62) Division of application No. 09/839,611, filed on Apr. 20, 2001, now Pat. No. 6,655,653.

(51) Int. Cl.[7] .............................................. F16K 51/00
(52) U.S. Cl. ......................................... 137/14; 251/121
(58) Field of Search ............................. 251/33, 35, 37, 251/48, 50, 120, 121, 122, 210, 282; 137/1, 14

(56) References Cited

U.S. PATENT DOCUMENTS

| | | | |
|---|---|---|---|
| 2,747,612 A | * | 5/1956 | Lee .............................. 251/282 |
| 3,337,180 A | | 8/1967 | Carlton |
| 4,653,455 A | | 3/1987 | Eblen et al. |
| 4,653,723 A | | 3/1987 | Rizk et al. |
| 4,791,958 A | | 12/1988 | Brundage |
| 4,923,172 A | * | 5/1990 | Wood et al. .................. 251/282 |
| 4,941,508 A | * | 7/1990 | Hennessy et al. ............ 251/282 |
| 4,944,328 A | | 7/1990 | Brundage |
| 5,253,676 A | | 10/1993 | Craig |
| 5,318,270 A | | 6/1994 | Detanne et al. |
| 5,551,466 A | | 9/1996 | De Pieri |
| 5,597,014 A | | 1/1997 | Vick |
| 5,639,066 A | | 6/1997 | Lambert et al. |
| 5,810,328 A | * | 9/1998 | Boehland ..................... 251/118 |
| 5,876,184 A | | 3/1999 | Marcott |
| 5,911,245 A | | 6/1999 | Weber |
| 5,927,322 A | | 7/1999 | Rosenau |
| 5,944,042 A | * | 8/1999 | Takahashi et al. ........... 251/282 |
| 6,045,120 A | * | 4/2000 | Tarr et al. .................... 251/282 |
| 6,089,470 A | | 7/2000 | Teerman et al. |
| 6,089,528 A | | 7/2000 | Hajek, Jr. et al. |
| 6,145,805 A | | 11/2000 | Smith et al. |
| 6,349,920 B1 | | 2/2002 | Lewis et al. |

FOREIGN PATENT DOCUMENTS

| | | |
|---|---|---|
| DE | 42 38 727 A | 5/1994 |
| EP | 0 840 004 A | 5/1998 |
| GB | 2272747 | 5/1994 |

* cited by examiner

Primary Examiner—Eric Keasel
(74) Attorney, Agent, or Firm—Leydig, Voit & Mayer, Ltd.

(57) ABSTRACT

A mechanism for controlling forces in a valve assembly such as flow induced forces. The valve assembly comprises a valve body defining first and second flow passages. A valve is movable in the valve body along an axis to control fluid flow between the first and the second flow passages. The valve has first and second control edges that are relatively spaced axially and radially such that the valve includes a radially extending surface between the first and second control edges. First and second restrictions are formed between the first and second control edges and the valve body, respectively. The first and second restrictions form a intermediate pressure region such that when the first and second flow passages are at different fluid pressures with fluid flowing past the valve, the intermediate region acts on the radially extend surface of the valve.

20 Claims, 14 Drawing Sheets

METHOD TO REDUCE FLOW FORCES IN HYDRAULIC VALVES

CROSS-REFERENCE TO RELATED PATENT APPLICATIONS

This patent application is a divisional of U.S. patent application Ser. No. 09/839,611, filed Apr. 20, 2001, now U.S. Pat. No. 6,655,653.

FIELD OF THE INVENTION

The present invention relates generally to valves, and more particularly to mechanisms for counteracting or controlling forces imparted on such valves due to the flow of fluid.

BACKGROUND OF THE INVENTION

In fluid flow designs, particularly high pressure applications, high pressure fluid flow through valves creates forces which tend to close the valve, particularly when the valve is close to the cracking point or otherwise in or near to a 'fully closed position'. The flow force is often a significant contributor to the force required to stroke a valve. In hydromechanical applications, where the valve is stroked from a mechanical source with ample force, this is not generally a problem. The difficulty arises when a valve is stroked from an electromagnetic device, such as a solenoid or electric actuator which has distinct force limitations. Such force limitations in turn limit the largest size possible for single-stage electrohydraulic devices. To achieve larger valve sizes, a two-stage system or some technique for reduction of the flow forces must be implemented. The invention described herein, refers to a novel method for reduction of flow forces.

Of particular interest in this invention are the 'flow induced forces' tending to close the valve, although flow forces may in some configurations be opposite in direction. In high pressure applications, the main reason for these flow induced closing forces is because the crack or opening at one axial end of the valve causes a localized pressure decrease as fluid escapes. However, the pressure at the other axial end of the valve does not experience the same localized decrease in fluid pressure and continues to remain high such that the opposing axial forces at the axial ends of the valve are unbalanced tending to urge the valve closed. Closing forces also occur due to fluid acceleration and angle of exit of the flow. This applies but is not limited to poppet valves, spool valves, or other similar linearly translatable valves. These forces are sometimes referred to as "flow induced forces" or "hydraulic reaction forces".

The problem with 'flow induced forces' is that the forces needed to stroke a valve can be very high. The conventional prior art approach of dealing with 'flow induced forces' has been to either use a two-stage system or incorporate large actuator forces and return spring forces into a valve assembly for the purpose of overcoming the 'flow induced forces'. According to one common valve assembly arrangement, a large spring force is used to overcome the 'flow induced forces' to move the valve to an open position while a solenoid is used to overcome the spring force to close the valve. These 'flow induced forces' diminish in a substantial exponential manner as the valve continues to open resulting in an unduly large spring force when the valve is fully open. The solenoid must overcome this large spring force to close the valve from the fully open position.

The large force actuators require more electrical power both in terms of currents and voltages. A typical voltage available in engine environments is often 24V. However to drive the larger solenoids and achieve acceptable slew times, voltages in the region of 100–120V are sometimes necessary. For a 24V voltage supply this will normally require a step-up power supply. Thus, this is an undesirable drawback with current systems.

Still further, a moving valve may open fully and then experience an unwarranted reclosure due to the kinetic energy of movement in combination a particular spring and flow forces. This is a problem that exists in certain applications that can be difficult to solve.

Still further, for a given electric actuator force and for the case of poppet valves in high pressure applications, a hold-in force is required to keep the valve at its seat to prevent leakage. In high pressure applications, this force can be significant. For the case of an electric actuator and return spring arrangement, the net force available for sealing depends on the value of the spring preload. Again this requires higher actuator and return spring forces.

In summary, the typical prior art approach of simply incorporating a lot of "muscle" by including large spring forces and large solenoid forces is undesirable for a number of reasons, that typically include any of the following: cost and size drawbacks associated with providing larger solenoids (or other actuators) and larger spring forces; assembly difficulties; larger stress and/or impact loads; higher driver voltage requirements and/or a decrease in valve speed. There have been some attempts to reduce these 'flow induced forces' or otherwise control other forces in valves. However, prior approaches have not sufficiently solved the problems in the art, cause other difficulties/problems or are not specific to translatable valve.

BRIEF SUMMARY OF THE INVENTION

It is a primary object of the present invention to provide a better solution to the problem of 'flow induced forces' in valve assemblies and/or otherwise provide an improved mechanism for controlling fluid forces in a predetermined manner.

In this regard, it is a more specific objective of the present invention to provide a valve assembly that controls 'flow induced forces' better to achieve one or more of the following advantages depending upon the application, including but not limited to: smaller actuator forces, smaller spring forces, reduced operating currents and voltages of electric actuator driven systems, reduced part stress, reduced impact loads, increased speed or responsiveness, lower actuator cost, improved reliability, improved valve assembly lifespan, and/or reduced risk of valve reclosure.

It is a further objective to provide a mechanism for reducing 'flow induced forces' that is relatively easy to implement across a number of different types and sizes of valves, including poppet valves, spool valves, and other reciprocating valves.

A further objective is to provide a counterbalance to the 'flow induced forces', which varies according to the position of the valve. One such fluid mechanism would deliver a force which is similar in shape to the 'normal' closing (negative) forces but opposite in direction. This implies a mechanism which can sharply increase the positive counteracting axial forces as the valve approaches its closed position or vice-versa in the opposite direction of movement. One goal may be to achieve or approach the state of a fully 'balanced valve' throughout its stroke range or another may be to shape the flow force curve to a given profile.

A still further objective of the design is to use the momentum of the exiting fluid to impart a force on the valve, by turning the fluid through an angle as it impacts the valve. By dissipating available energy to effect a force on the valve, the pressure loss caused by introducing any additional restrictions can be minimized. The angle of deflection of the fluid can be controlled by the angle of the impact surface in the intermediate region or by its shape. Generally turning the fluid through a 90 degree bend will impart the maximum momentum onto the valve.

In accordance with these and other objectives the present invention is directed toward a mechanism for fluidically controlling 'flow induced forces' in a valve assembly. The valve assembly comprises a valve body defining first and second flow passages. A valve is movable in the valve body along an axis to control fluid flow between the first and the second flow passages. The valve has first and second control edges. The second control edge is spaced axially and radially from the first control edge such that the valve includes a radially extending surface between the first and second control edges. First and second restrictions are formed between the first and second control edges and the valve body, respectively. The first and second restrictions form a intermediate pressure region such that when the first and second flow passages are at different fluid pressures with fluid flowing past the valve, the intermediate region acts on the radially extending surface of the valve. The pressure of the intermediate region can be used to counteract opposing axial 'flow induced forces' acting on the valve or otherwise provide a desired valve bias.

The present invention is also directed to a method of counteracting 'flow induced forces' in a valve assembly comprising controlling and restricting the fluid flow from a pressurized high pressure region radially outward to a low pressure region with a first restriction between the valve and the valve body. The restricted fluid flow is then again restricted with a second restriction between the valve and the valve body. This forms an intermediate pressure region between the first and second restrictions having a fluid pressure between that of the low and high pressure regions. The intermediate pressure region applies a counteracting axial force to the valve using the fluid pressure of the intermediate pressure region acting on the valve. The counteracting axial force provided by this design counteracts the otherwise naturally occurring 'flow induced forces'.

The present invention solves many of the various problems discussed in the background section. For example, by significantly reducing the 'flow induced forces', the 'load' on the solenoid is reduced and fast slew times can be achieved with larger electrical actuators operating at 24V supply and utilizing relatively low values of spring force. Also, by approaching a balanced valve hydraulically, the variations for different flow rates and pressures are reduced and thus there is less cycle to cycle variation of the closure point of the valve in fuel injection applications. A further advantage is that by shaping the flow forces at fully open to be balanced or even positive (tending to open the valve), undesirable side effects of valve reclosure such as delayed spill or secondary injections in a fuel injection system can be prevented. For fuel injection and other applications, the invention can reduce the return spring force such that more force is available for sealing or alternatively the same size actuator can seal a bigger diameter valve. In sum, the invention has wide appeal across many different applications and resolves many of the problems that have been heretofore experienced.

Other objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention, and together with the description serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

For purposes of illustration, a preferred embodiment has been illustrated as a mechanism for controlling fluid forces generally indicated at 10 and incorporated in a valve assembly 12 in one of the exemplary environments of a diesel fuel injection circuit 14. It will be understood that diesel fuel injection circuit 14 is an exemplary one of the many possible applications of the invention and has been used for the purpose of developing a better understanding for the reader. For purposes of understanding the drawings, certain details of the fuel injection circuit 14 will be described here in short. The fuel injection circuit 14 includes a reciprocating piston pump 16 adapted to pump and pressurize fuel sufficiently for atomization by one or more nozzles 18. The valve assembly 12 is used in this application for selectively recirculating excess fuel flow and pressure back to a sump.

Figure 2:
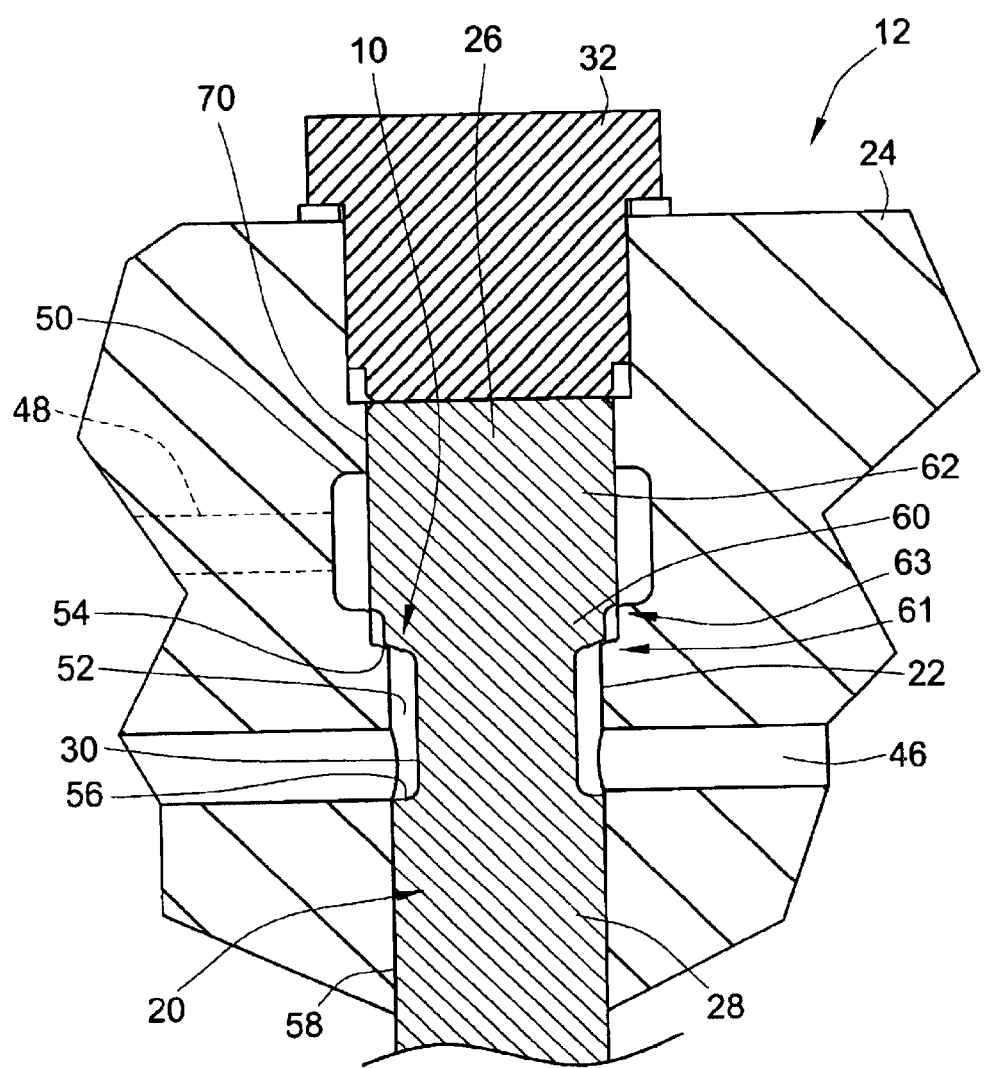
FIG. 2 is an enlarged portion of the cross section of FIG. 1, illustrating the valve in a fully open position.

The valve assembly 12 includes a cylindrical poppet type valve 20 mounted for sliding linear reciprocation along an axis 25 in the cylindrical valve chamber 22 of a valve body 24. The poppet valve 20 includes a cylindrical control land 26 and a cylindrical guide land 28 in spaced axial relation, connected by a reduced diameter neck section 30. The lands 26, 28 engage the sidewall of the valve chamber 22 to guide the stroke of the valve. A plug 32 encloses one end of the valve chamber 22 and has an inner end that limits axial movement of the valve 20 in one axial direction. At the other end of the valve, an actuation mechanism is provided in the form of a solenoid 34 and a return spring 36. The return spring 36 is supported by a spring support plate 38 and engages a washer 40 to urge the valve 22 in one direction toward an open position as shown in FIG. 2. When energized, the solenoid 34 overcomes the force of the spring 36 and attracts a round armature 44 mounted to the end of the valve 20 to move the valve 20 to the closed position as shown in FIG. 3.

The valve chamber 22 fluidically connects a first flow passage 46 with a second flow passage 48. In the disclosed embodiment the first flow passage 46 is subject to high pressure (e.g. up to about a maximum of 22,000 psi for diesel fuel injection applications) while the second flow passage 48 is subject to a lower pressure sump (e.g. around 100 psi for diesel fuel injection applications). The control land 26 controls or regulates fluid flow from the first flow passage 46 (extending axially through the valve chamber 22 around the neck section 30 in annular channel 52) to the second flow passage 48. The second flow passage 48 includes an annulus 50 radially about the control land 26 for draining to a low pressure sump (not shown).

Figure 3:
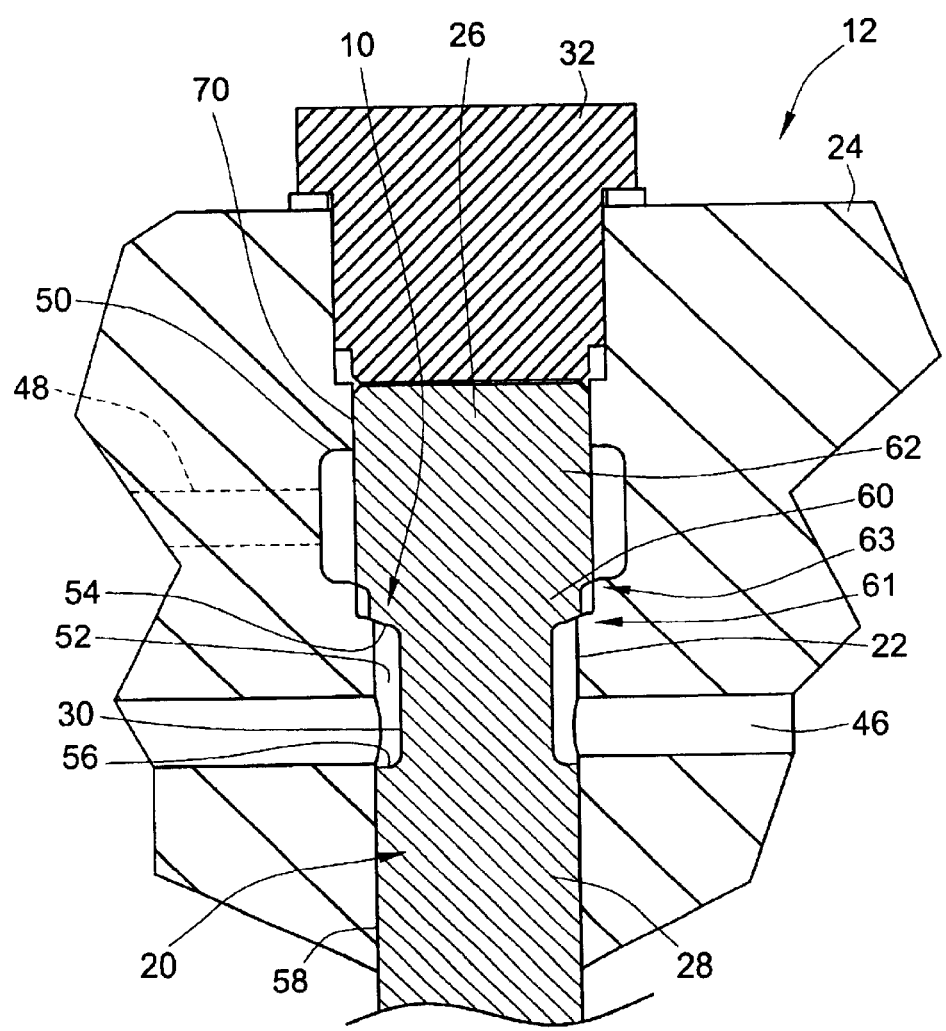
FIG. 3 is the same view as FIG. 2 but with the valve in a fully closed position.
Figure 4:
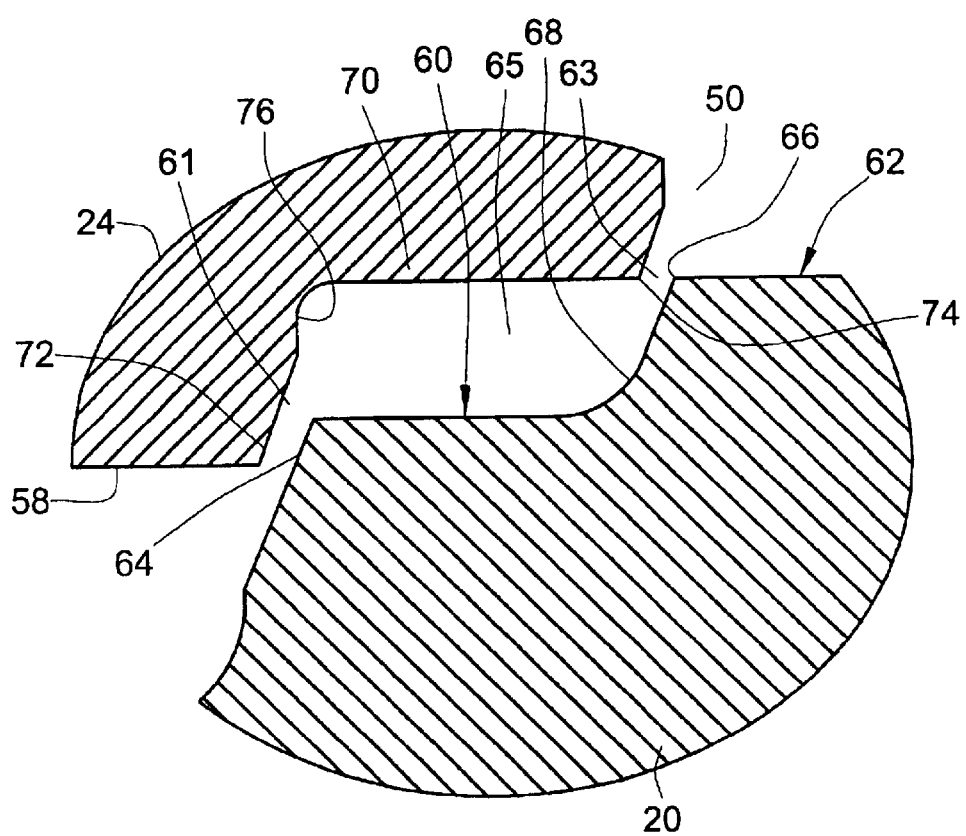
FIG. 4 is an enlarged portion of the cross section of FIG. 2.

When the valve 20 is closed as shown in FIG. 3, fluid pressure in the annular channel 52 applies substantially equal opposing axial forces against the opposed radially extending faces 54, 56 of each of the lands 26, 28 (See FIG. 1) such that the valve 20 is effectively not biased by fluid pressure in either axial direction. This is because the inner diameter of the faces 54, 56 (which is the outer diameter of the neck section 30) and the outer diameter of the faces 54, 56 (substantially equivalent to the diameter of the small diameter bore section 58) are substantially equal, thereby providing equal surface area exposed to the fluid pressure.

However, when the valve 20 cracks open from the closed position of FIG. 3 moving towards the fully open position of FIG. 2, the sudden draw of fluid from the annular channel 52 to the second flow passage 48 causes a localized pressure drop in proximity to the control land face 54. Without the application of the invention disclosed herein, this would cause an unbalance in axial forces across the valve 20 tending to urge the valve 20 closed.

In accordance with the present invention, the disclosed embodiment incorporates a pair of flow restrictions 61, 63 in series that provide an intermediate pressure region 65 having an intermediate pressure that may be between that of the first and second flow passages 46, 48. The intermediate pressure region 66 acts axially on the valve 20 to counteract opposing axial 'flow induced forces' tending to close the valve 20.

To provide the restrictions 61, 63, the valve control land 26 includes adjacent small and large diameter sections 60, 62 of different diameters providing a pair of control edges 64, 66 that are radially and axially spaced. The control land 26 defines a radially extending surface in the preferred form of a cut out annular shoulder 68 between the edges 64, 66 (or restrictions 61, 63). The axial spacing of the control edges 64, 66 and restrictions 61, 63 also creates balancing axial force due to the axial acceleration and redirection of fluid flow in the intermediate pressure region 65. This improves balancing of the valve hydraulically.

To accommodate the profile of the control land 26, the valve chamber includes an enlarged diameter bore section 70 in which the control land 26 slides. The valve body 24 defines complementary control edges 72, 74 that are axially and radially spaced. The control edges 72 and 74 in combination with the control edges 64, 66 of the control land 26 form the first and second restrictions 61, 63. All of the control edges 64, 66, 72, 74 may be part of a chamfered surface as shown for the first restriction 61 or sharp corners as shown for the second restriction 63 (the edges 64, 66 may also be rounded, profiled or other suitable shape as will be appreciated with the various embodiments disclosed herein). A cut out shoulder 76 is preferably formed between the control edges 72, 74. The intermediate pressure region 65 is thus provided in a pocket axially between the shoulders 68, 76.

Figure 1:
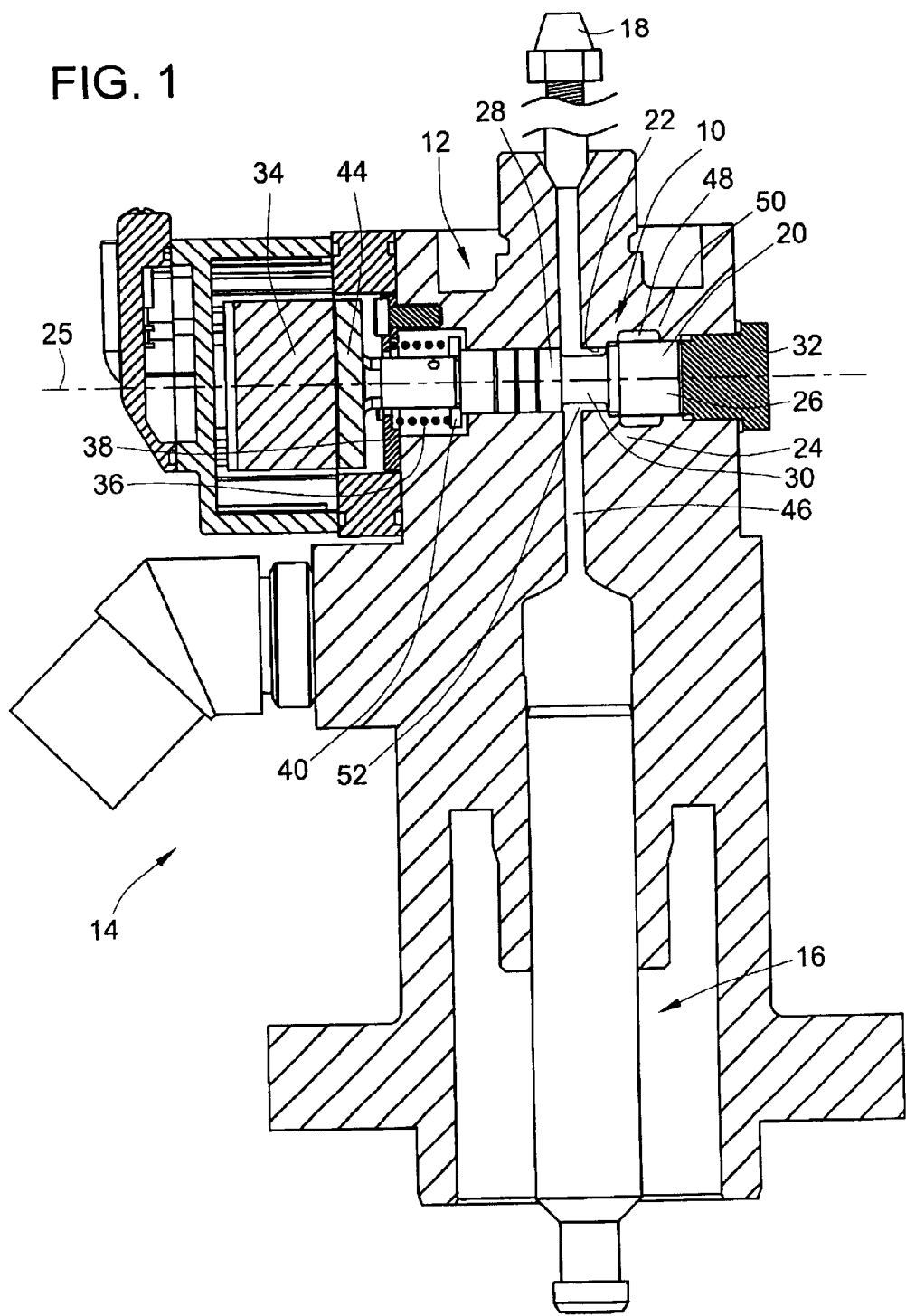
FIG. 1 is a cross section of a valve assembly according to a preferred embodiment of the present invention incorporated in a diesel fuel injection system with a piston and nozzle of system being schematically illustrated.

When the valve 20 is cracked open from the closed position as shown in FIG. 3 to the open position illustrated in FIG. 1, the intermediate pressure region 65 is provided with an intermediate pressure between the pressures of the upstream first passage 46 and downstream second passage 48. This intermediate pressure region 65 acts axially on the annular shoulder 68 between the first and second restrictions 61, 63 providing an axial force that can oppose the naturally occurring 'flow induced forces' tending to keep the valve closed.

Figure 5:
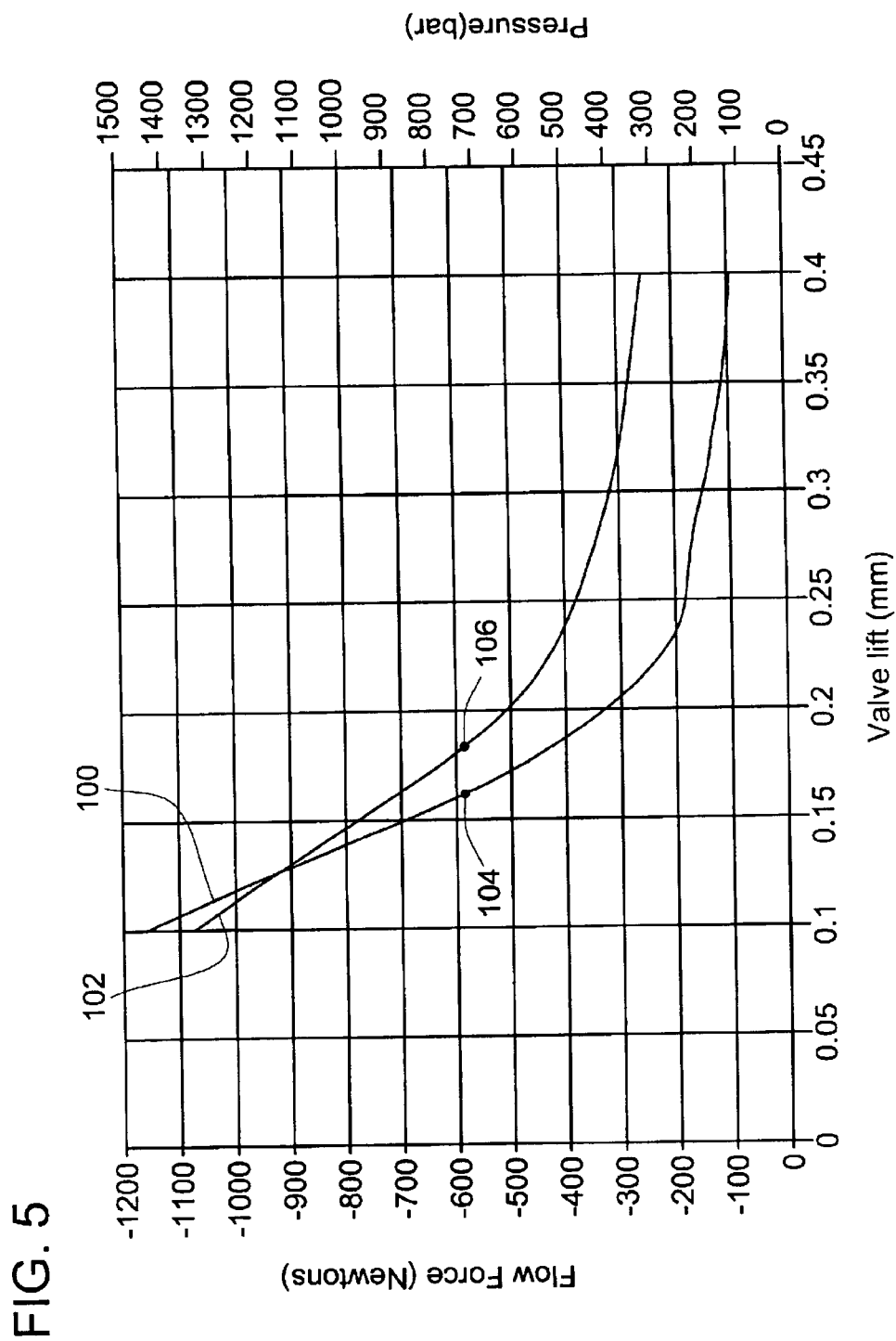
FIG. 5 is a graph of experimental data from an implementation of an embodiment.

FIG. 5 graphically illustrates the flow induced force 100 and counteracting force 102 of the flow control mechanism 10 for the implementation of the disclosed embodiment in FIGS. 1–4. At the cracking point in FIG. 5, the flow induced force 100 experienced was 1450 bar (or about 1150 pounds per square inch). The flow control mechanism 10 is designed to provide counteracting force 102 to substantially counteract the flow induced force 100, in this case about 1300 bar, sufficient to reduce the necessary force of the spring 36 and solenoid 34 desired to produce the desired speed and responsiveness for the valve assembly 12.

At the cracking point, the difference in flow area between the first and second restrictions 61, 63 are selectively sized in relation to the surface area and shape of the shoulder 68 to provide a counteracting force to oppose the typical anticipated axial flow induced force that will be experienced. The sizing and spacing of the restrictions 61, 63 and can be closely estimated using a computational fluid dynamics program and then fine tuned with actual prototype testing. For practical application and benefit, the selective sizing produces a counteracting force 102 (produced by the fluid pressure in intermediate region 65) that opposes roughly between 50% and 130% (ideal is 100% at cracking point) of the axial flow induced force 100 (measured at the cracking point) sufficient to achieve one or more of the desired goals mentioned herein.

Figure 6:
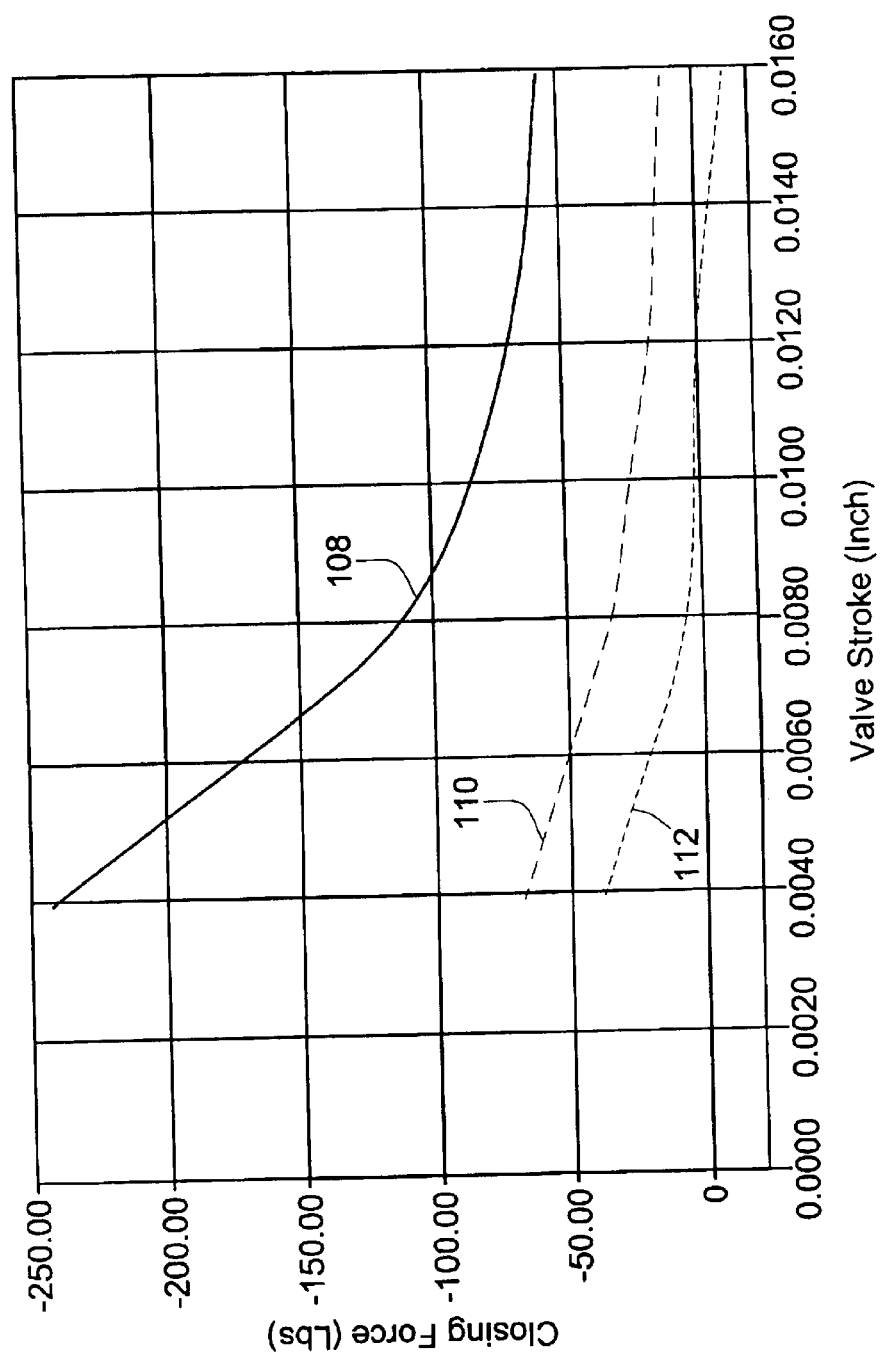
FIG. 6 is a graph of data computed using computational fluid dynamics program for two different implementations of an embodiment (with valve parameters modified) compared with a standard valve without the invention.

It is an advantage of the flow control mechanism 10 that as the valve continues to open, the magnitude of the axial flow induced force 100 and the counteracting force 102 decrease in a substantial exponential manner and in substantial proportion to one another as is generally illustrated in FIG. 5. This results in an actual closing force on the valve that is substantially less than the same valve without the disclosed mechanism for fluidically controlling forces as is illustrated in FIG. 6 (line 108 showing a conventional standard design (without the invention), line 110 illustrating one implementation according to one selected set of parameters and line 112 illustrating a second implementation according to a second selected set of parameters). The valve parameters may even be selected such that negative closing forces develop at a certain point, which may be useful in certain applications.

With the disclosed embodiment, the counteracting force continues to fully counteract most of the 'flow induced forces' up until the point at which 'flow induced forces' become rather insignificant from a design perspective for example when the flow induced force is reduced in half. The selection of the restrictions 61, 63 and shape of the shoulder 68 are preferably also designed that then when the axial flow induced force becomes one half of what it was at the cracking point the counteracting force continues to oppose roughly between 50% and 130% of the axial flow induced force (again the goal is typically be a 100% counteracting force and sometimes up to 130%). This is illustrated for example by midpoints 104 and 106 in FIG. 5.

The particular valve disclosed is a poppet type valve although the invention is applicable to other reciprocating valves such as spool valves. The disclosed embodiment using the upstream smaller diameter control edge 74 acts as a valve seat upon which the control land 26 seats to fully shut off flow along an annular contact line, as shown in FIG. 3. When the valve 20 is fully closed as in FIG. 3, the second restriction 63 is open a small degree which may be an axial distance of between 0 and ½ of the valve stroke. The area of the secondary restriction at the valve open position can range normally from 1.0 to 3.0 of the first restriction flow area but most commonly 1.1 to 1.5 of the first restriction flow area for maximum benefit (the lower limit being important to prevent impediment of closing due to trapped fluid in the intermediate region 65 while the upper limit has been found to be the point where benefit substantially diminishes although some benefit is still realized up to roughly 3.0 with sharp corners which axially accelerate fluid). As illustrated, the flow areas of the first and second restrictions 61, 63 are configured to increase and decrease in unison. The first and second restrictions 61, 63 may also increase and decrease in size in substantial linear proportion as disclosed in the illustrated embodiment such that the size of the second restriction 63 is always slightly larger than the first restriction 61 by a fixed amount.

The invention is most beneficial to applications where there is a large pressure differential when 'flow induced forces' become very large. For practical implementation of the present invention, and depending upon valve size and anticipated pressure differentials, the first and second restrictions may be spaced axially between 0 and 5 millimeters, and radially between 0 and 3 millimeters (measured at the inner diameters). Practically the axial distance between restrictions can range from 0 to about 10 mm, although the design is usually not restricted to an upper limit from a hydraulic point of view, primarily limited by the available space.

Although a poppet valve 20 has been illustrated, it will be understood that the invention may also be incorporated into similar valves such as a spool valve, and/or other similar valves. Spools have a constant diameter of all control lands and make implementation more difficult that would possibly require a two piece housing or an insert. The principle can be applied to spools because they suffer from the exact same problem. The difference between a poppet valve and a spool valve is that a spool valve does not includes a valve seat upon which the valve seats to completely close off fluid flow as there may or may not be de minimis fluid flow in the closed position (e.g. between the cylindrical contact surfaces of the valve and valve body).

Several advantages can readily be realized by implementing the invention including smaller actuator forces, smaller spring forces, and lower actuator cost due to the fact that less force is needed to move the valves as the 'flow induced forces' are counteracted with the novel mechanism 10. The reduced forces used also leads to reduced part stress and reduced impact loads. The invention may be used simply to increase speed or responsiveness as there is not a large force to overcome when cracking a valve.

Several variations and alternative embodiments of the present invention that may be employed are illustrated in FIGS. 7–14. The embodiments work according to a similar principle as the first embodiment of FIGS. 1–4 previously discussed, and as such similar designators will be used (with alphabetic characters used to differentiate between embodiments).

Figure 7:
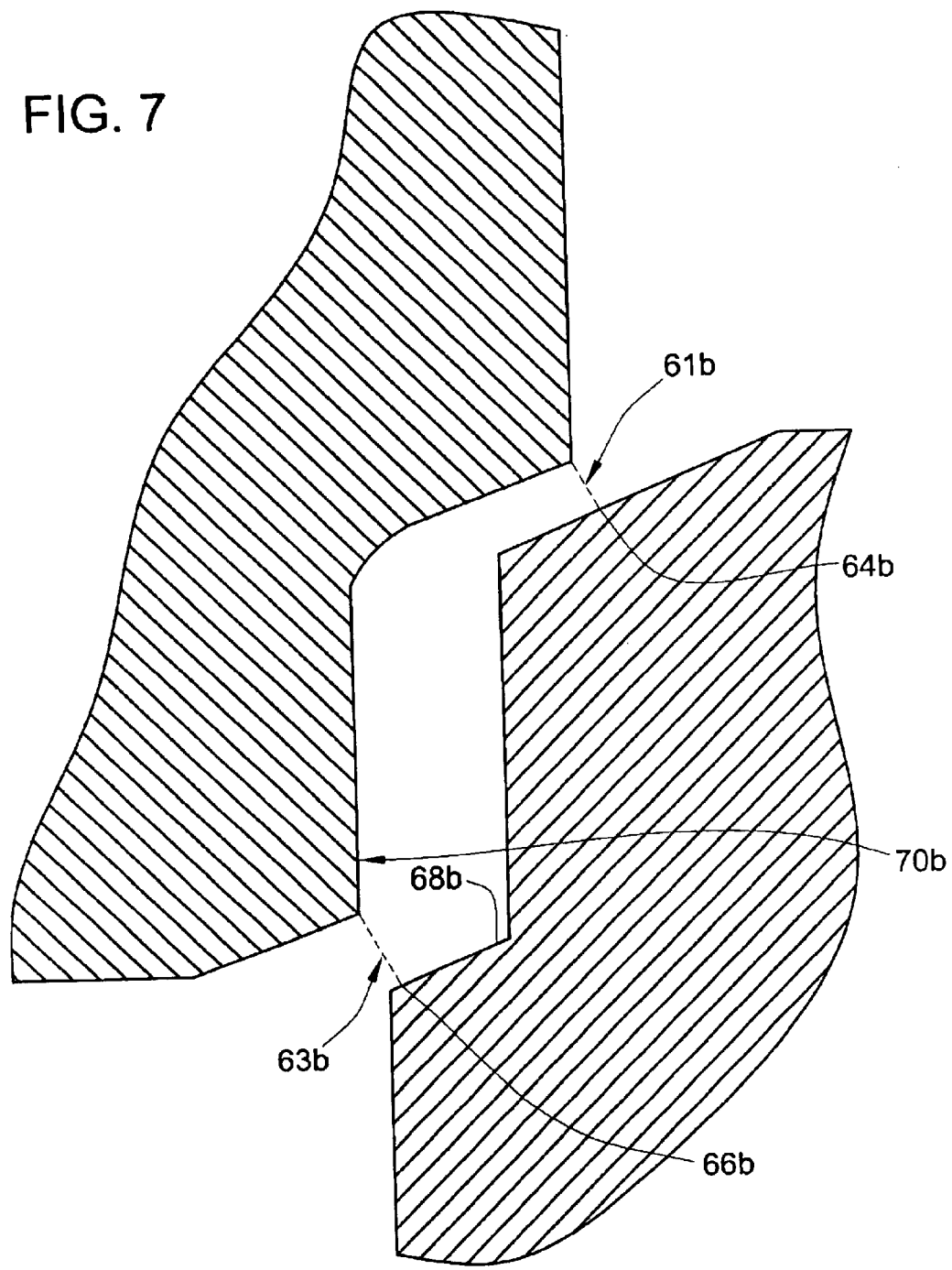
FIGS. 7–8 are cross section of a second embodiment of the present invention with FIG. 7 in an open position and FIG. 8 in a closed position.
Figure 8:
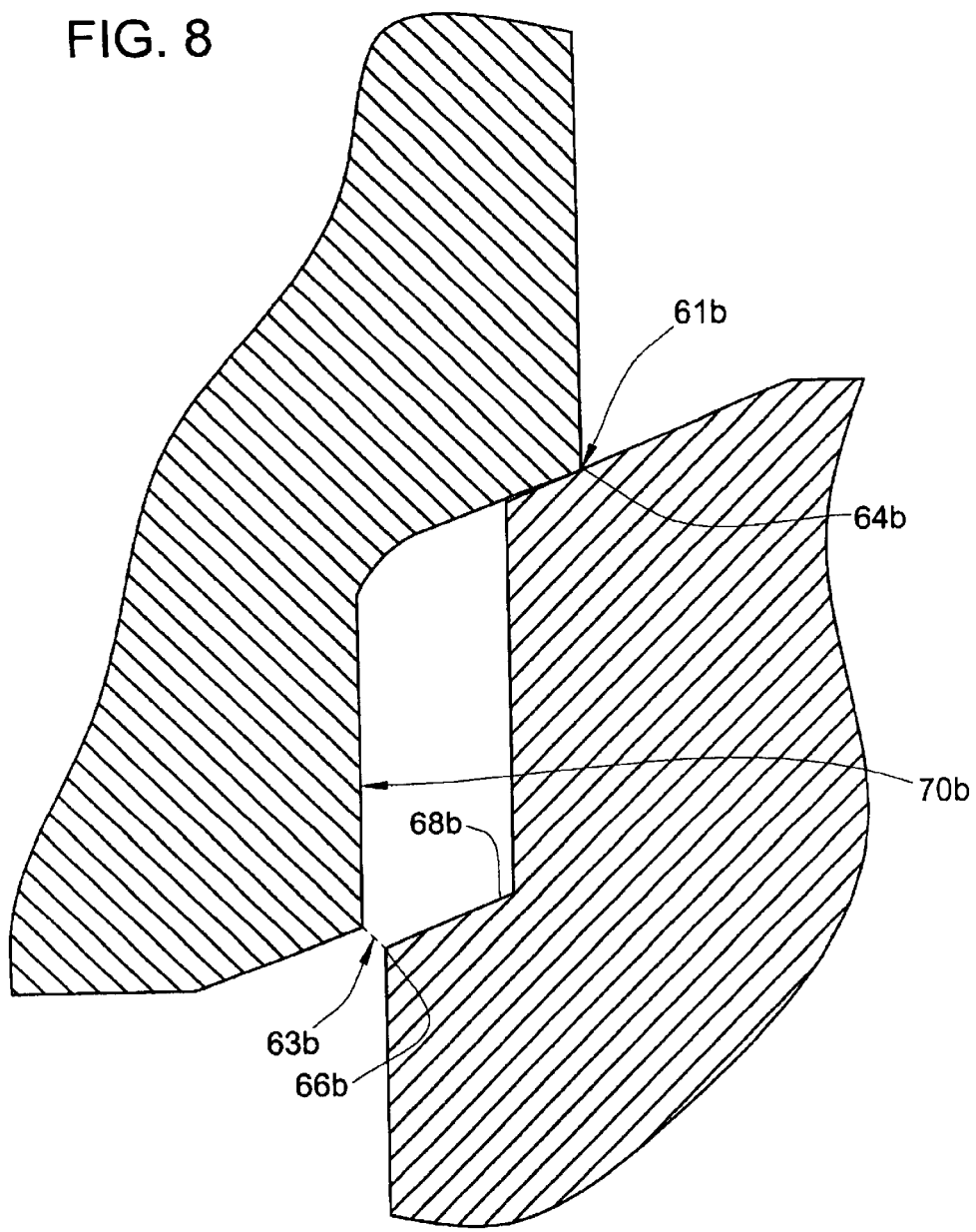

FIGS. 7–8 illustrate a second embodiment of the present invention similar in many respects to the first embodiment with chamfered control edges 64b, 66b with a composite shoulder 68b extending between the restrictions 61b, 63b formed thereby. The counteracting force characteristic of this valve can be selected by modifying a couple of readily adjustable parameters. For example, the diameter of the larger land section 62b can be selected relative larger bore section 60b to modify the radial dimension of the shoulder 68b. For example, the larger land section 62b can have a larger diameter, a smaller diameter or an equal diameter to the larger bore section 60b, with each different diameter producing a different characteristic. Also, more material can also be ground off of the first metering edge 64a to narrow the second restriction 63b and make it closer in size to the first restriction 64a over the entire valve stroke.

Figure 9:
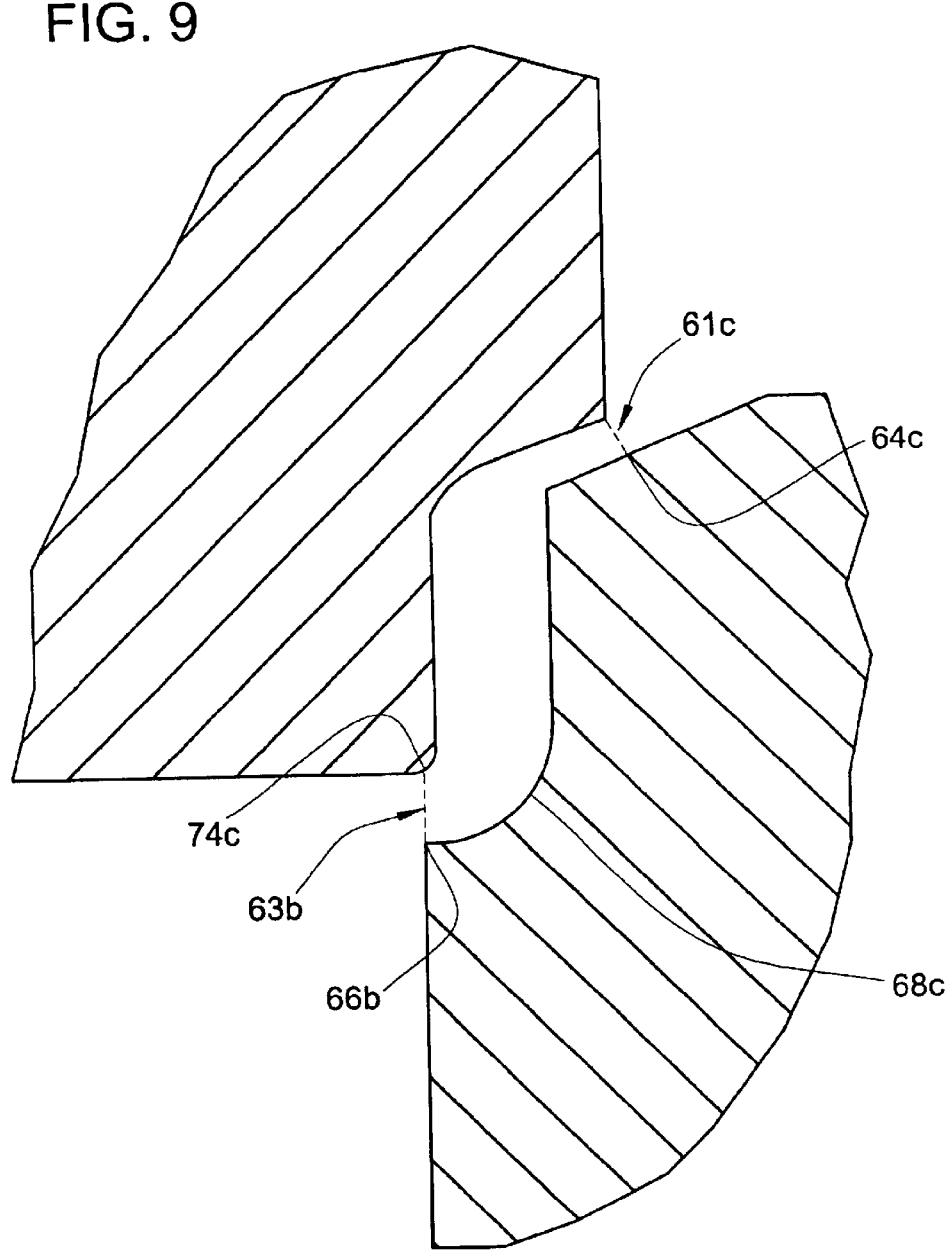
FIG. 9 is a cross section of a third embodiment of the present invention.

FIG. 9 illustrates a radiused impact surface in which the flow in the intermediate pressure region must be turned through a ninety degree bend, thus maximizing the impact surface of the annular shoulder 68c between the metering edges 64c and 66c, and thereby maximize the amount of force realized. This embodiment also illustrates that a sharp corner (and radiused corner 74c) at metering edge 66c may be used in addition to chamfered edges to form the restrictions 61c, 63c. The characteristic of this valve may be selectively changed during manufacture by the same methods indicated previously for the embodiment of FIGS. 9–10.

Figure 10:
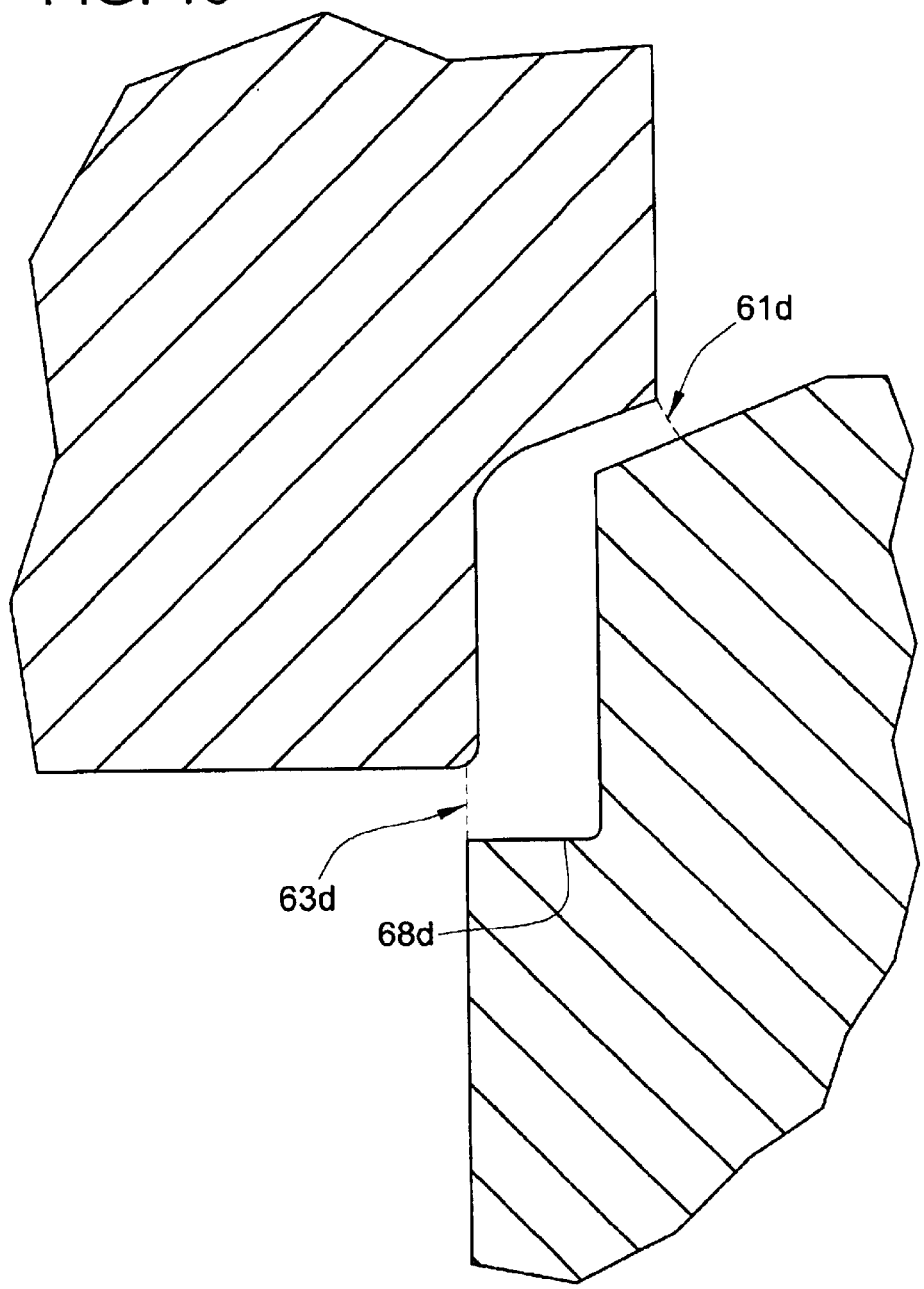
FIG. 10 is a cross section of a fourth embodiment of the present invention.

FIG. 10 illustrates a further variant similar to FIG. 10 with a 90 degree sharp corner to form the shoulder 68d between the restrictions 61d and 63d. The shoulder 68d again requires a complete ninety degree turn of fluid flow thus maximizing the impact surface and the generated force.

Figure 11:
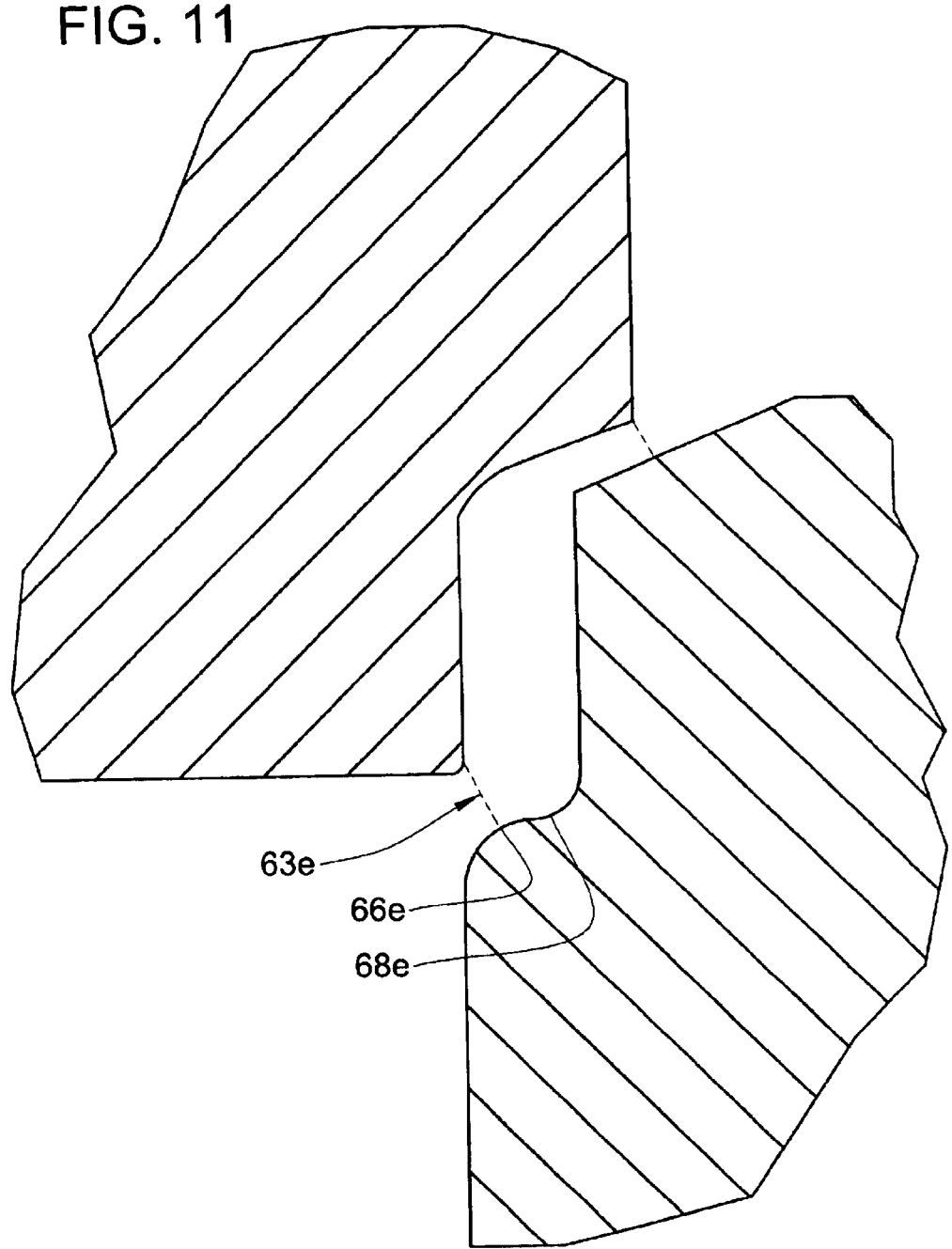
FIG. 11 is a cross section of a fifth embodiment of the present invention.

FIG. 11 illustrates a more complex arrangement that can be used to closely configure the impact surface of the annular shoulder 68e. The second control edge 66e takes on a radiused profile at the second restriction 63e.

Figure 12:
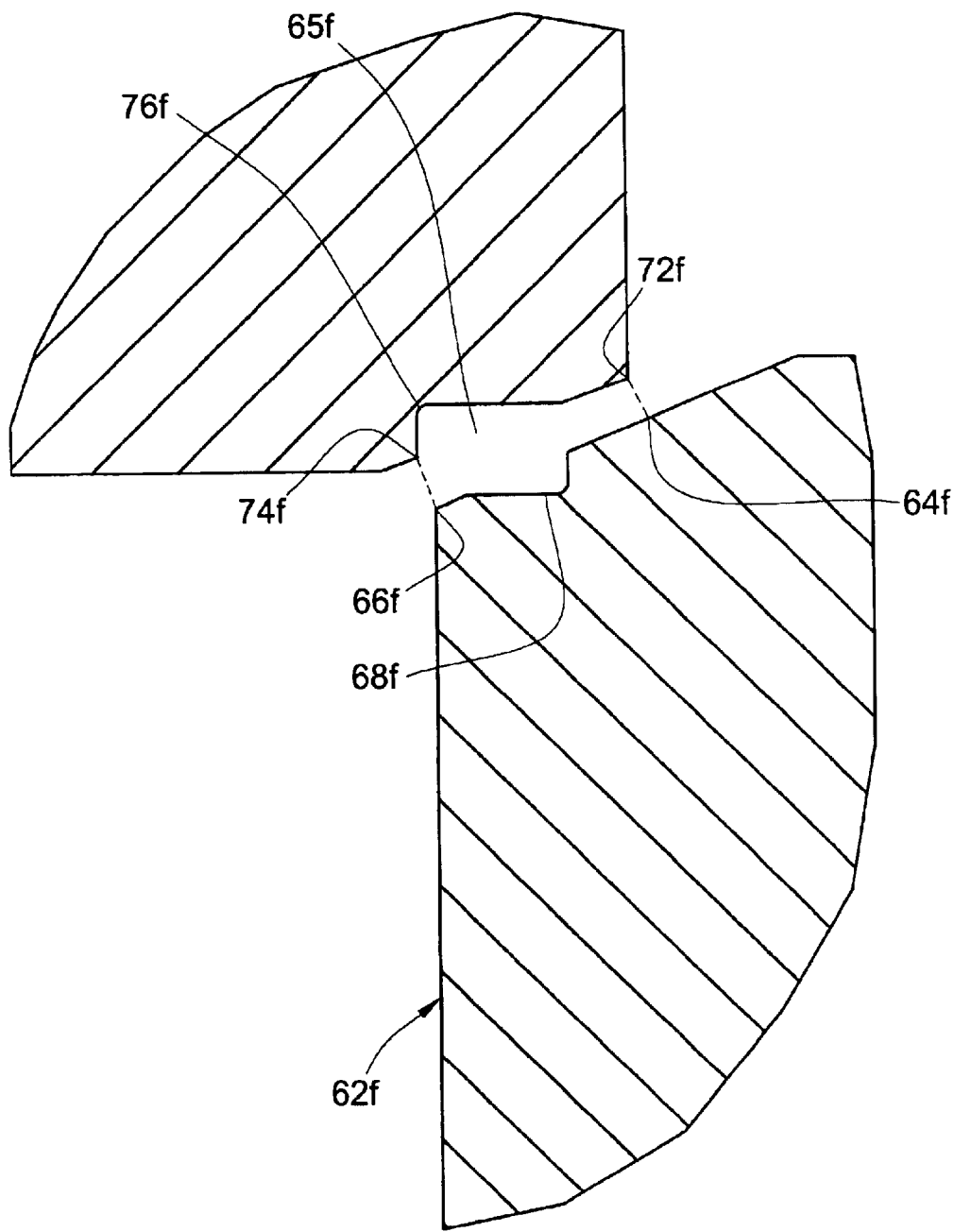
FIG. 12 is a cross section of a sixth embodiment of the present invention.

FIG. 12 illustrates a further embodiment that may provide for easier manufacture. In FIG. 12, there is zero offset between the sets of chamfered control edges 64f, 66f and 72f and 74f such that the chamfers can be ground together. The intermediate pressure region 65f is a pocket formed by two cut out shoulders 68f and 76f in the valve housing and the valve land. The intermediate pressure region 65f acts on the shoulder 68f to provide the desired effect. In this embodiment the diameter of the large land section 62f can modified to change the flow characteristic as desired.

Figure 13:
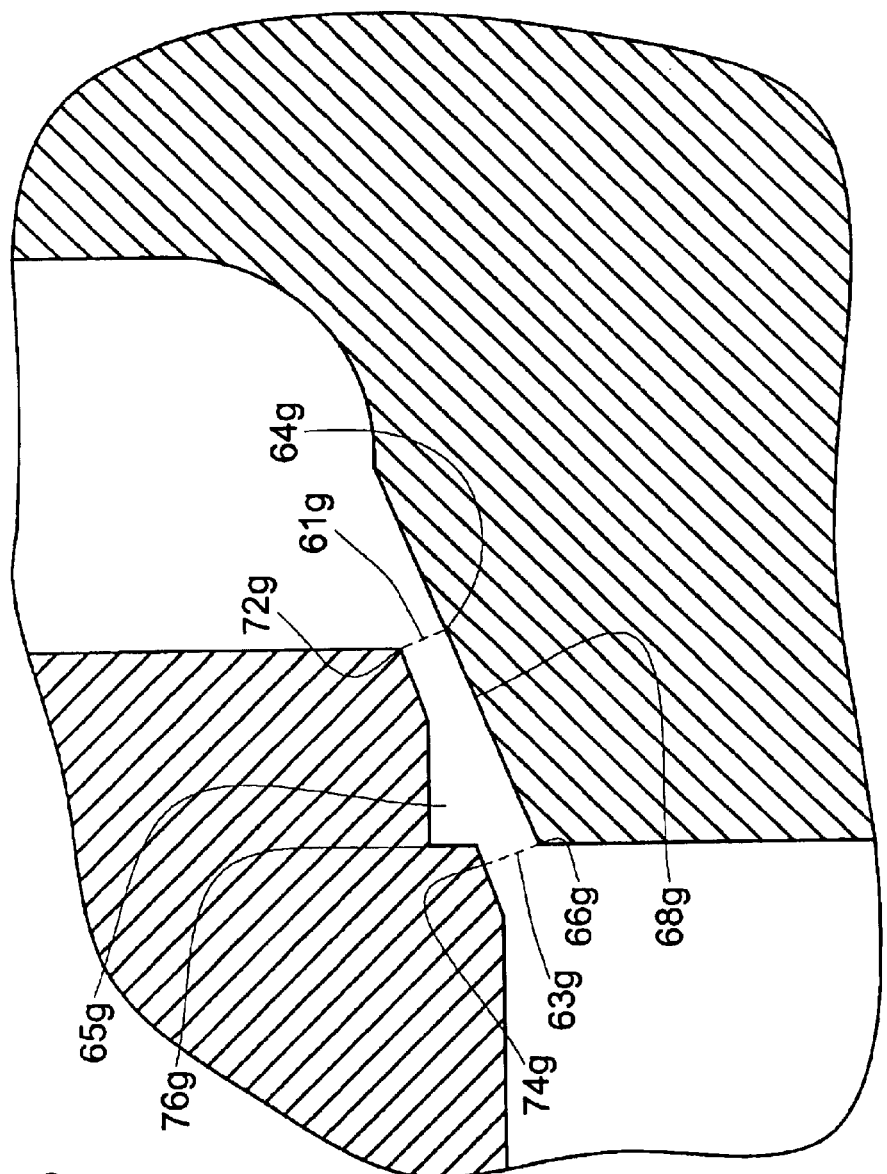
FIG. 13 is cross sections of a seventh embodiment of the present invention.

FIG. 13 illustrates a further embodiment of the invention in which a radially extending surface 68g is formed along the same chamfered surface as the first and second annular control edges 64g, 66g, without a distinct cut out shoulder. This is less preferred from a hydraulic balancing standpoint however in that the flow is not directed in an axial direction and no axial momentum forces are impacted on the valve. In this embodiment, the intermediate pressure region 65g is provided by a cutout shoulder 76g in the valve housing only. The second restriction 74g formed between control edges 66g and 74g may be slightly larger in flow area than the first restriction 72g formed between control edges 64g, 72g. The benefit of this design is ease in manufacture however significant hydraulic control force advantages of the other embodiments are not realized nearly as much.

Figure 14:
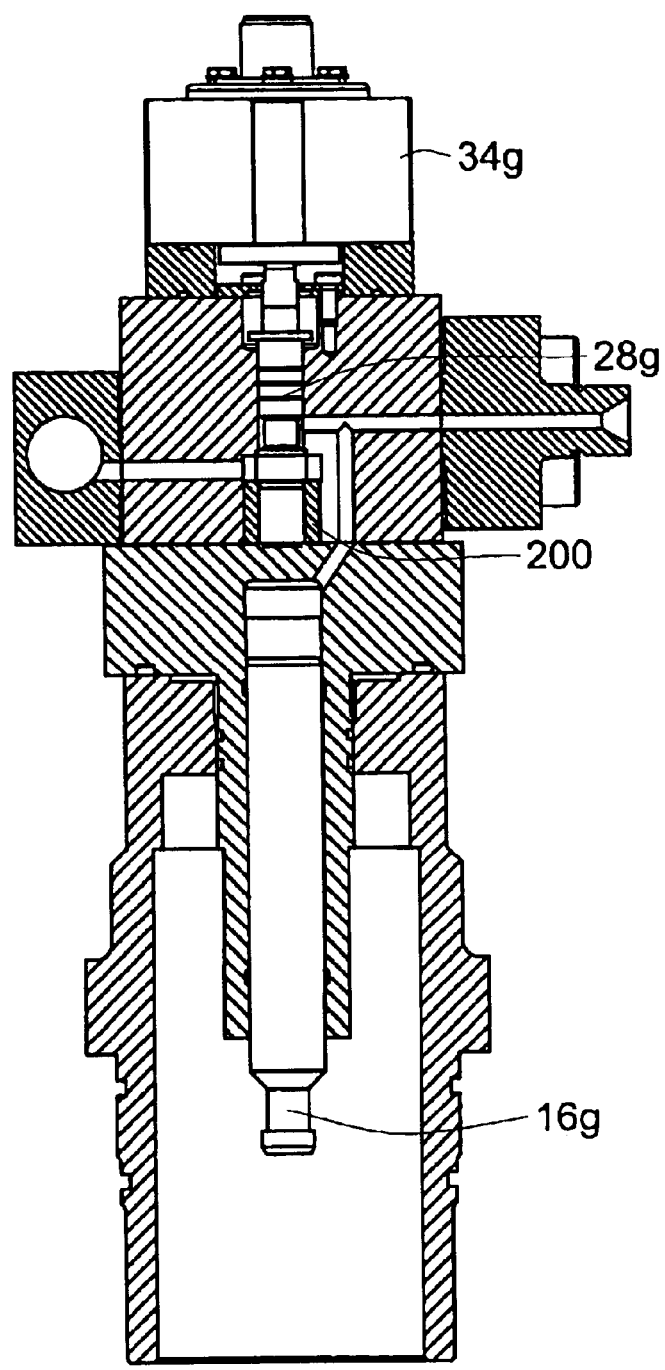
FIG. 14 is another embodiment of a valve assembly analogous to FIG. 1 but with a beneficial optional feature.

FIG. 14 also illustrates the fact that that a different orientation of the valve 28g and solenoid 34g can be accomplished relative to the piston pump 16g, in comparison with that shown in FIG. 1. Instead of a stop plug, a bushing 200 is used to control the stroke of the valve 28g. The bushing 200 provides the advantage of controlling the exposed surface of the second end of the valve 28g to fluid pressure only inside the bushing 200 (thus an effective face equal to the area contained within the inner diameter of the bushing). Specifically, the terminating or opposite ends of the valve 28g (e.g. guide land and control land) can have an equal amount of face area exposed to fluid pressure (or otherwise a predetermined difference) while the valve is in the fully open position abutted up against the bushing. Thus the inner diameter of the bushing is sized closely to the diameter of the guide land (the control land has a large diameter due to radial spacing of restrictions). This again is for valve balancing.

The foregoing description of various embodiments of the invention has been presented for purposes of illustration and description. It is not intended to be exhaustive or to limit the invention to the precise embodiments disclosed. Numerous modifications or variations are possible in light of the above teachings. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A method of counteracting flow induced forces in a valve assembly comprising a valve and a valve body, the valve body including an axial valve chamber and a radial passage, the valve being translatable in the axial valve chamber, comprising:

pressurizing fluid in the axial valve chamber to a pressure greater than the radial passage;

controlling fluid flow from the axial valve chamber radially outwardly to the radial passage with the valve, the controlling of fluid causing an axial flow induced force to develop across the valve;

directing fluid flow from the axial valve chamber to the radial passage along a flow path that extends substantially in only one direction such that fluid flow between the axial valve chamber and the radial passage does not reverse direction therebetween;

restricting the fluid flow from the axial valve chamber to the radial passage with a first restriction between the valve and the valve body;

restricting the restricted fluid flow with a second restriction between the valve and the valve body radially outward of the first restriction, thereby forming an intermediate pressure region between the first and second restrictions, the intermediate pressure region having a fluid pressure between that of the axial valve chamber and the radial passage; and applying a counteracting axial force to the valve with the intermediate pressure region acting on the valve, the counteracting axial force counteracting the axial force of the axial flow induced force.

2. The method of claim 1, wherein the valve is movable between open and closed positions for permitting and preventing fluid flow between the axial chamber and the radial passage, respectively, further comprising:

cracking the valve open from the closed position at a cracking point for the valve; and selectively pre-sizing the second restriction greater than the first restriction relative to the axial flow induced force at the cracking point such that the counteracting force opposes substantially between 50% and 130% of the axial flow induced force at the cracking point.

3. The method of claim 2 further comprising:

simultaneously decreasing the magnitude of the axial flow induced force and the counteracting force as the valve continues to open from the closed position to the open position by increasing the size of the first and second restrictions in unison, wherein the counteracting force opposes substantially between 50% and 130% of the axial flow induced force at all valve positions between the cracking point and a position of the valve wherein the axial flow induced force is one half of the axial flow induced force at the cracking point.

4. The method of claim 2 further comprising selectively profiling a radially extending surface of the valve between the first and second restrictions.

5. The method of claim 1 further comprising:

proportionally increasing the size of the first and second restrictions in unison.

6. The method of claim 1 further comprising translating the valve to a fully open position wherein the size of the second restriction is between 1.1 and 1.5 times of the first restriction.

7. The method of claim 1 further comprising reciprocating the valve between two positions using a solenoid to move the valve one direction and a return spring to move the valve a second direction opposite said first direction.

8. The method of claim 1 wherein the first restriction and the second restriction are separated by an axial distance of between 0 and 10 millimeters and a radial distance of between 0 and 3 millimeters.

9. The method of claim 1 wherein the step of restricting at the first restriction comprises metering the fluid flow, wherein the first restriction is smaller than the second restriction, the first restriction increasing and decreasing in unison with the second restriction as the valve linearly translates.

10. The method of claim 1 further comprising guiding the valve linearly with a first land and a second land, the first and second lands being spaced apart and sliding against the axial valve chamber, the first land having the first and second restrictions.

11. A method of counteracting flow induced forces in a valve assembly comprising a valve and a valve body, the valve body including an axial valve chamber and a radial passage, the valve being axially translatable in the axial valve chamber between open and closed position to control fluid flow from a high pressure region to a lower pressure region, comprising:

creating a pressure differential between the axial valve chamber and the radial passage when in the closed position;

fluidically balancing fluid pressure across the valve in the closed position by having the high pressure region act upon opposed first and second valve lands such that substantially no axial force is generated on the valve by the high pressure region in the closed position;

cracking the valve open from the closed position at a cracking point for the valve; and controlling fluid flow between an axial valve chamber and the radial passage with the valve, the controlling of fluid causing an axial flow induced force to develop across the valve at the cracking point;

restricting the fluid flow between the axial valve chamber and the radial passage with a first restriction between the valve and the valve body;

restricting the restricted fluid flow between the axial valve chamber and the radial passage with a second restriction radially spaced from the first restriction, thereby forming an intermediate pressure region between the first and second restrictions, the intermediate pressure region having a fluid pressure between that of the axial valve chamber and the radial passage; and applying a counteracting axial force to the valve with the intermediate pressure region acting on the valve, the counteracting axial force counteracting the axial force of the axial flow induced force.

12. The method of claim 11 further comprising directing fluid flow from the axial valve chamber to the radial passage along a flow path that extends substantially in only one direction such that fluid flow between the axial valve chamber and the radial passage does not reverse direction therebetween.

13. The method of claim 11, wherein the valve is movable between open and closed positions for permitting and preventing fluid flow between the first and second flow passages, respectively, further comprising:

selectively pre-sizing the second restriction greater than the first restriction relative to the axial flow induced force at the cracking point such that the counteracting force opposes substantially between 50% and 130% of the axial flow induced force at the cracking point.

14. The method of claim 11 further comprising:

simultaneously decreasing the magnitude of the axial flow induced force and the counteracting force as the valve continues to open from the closed position to the open position by increasing the size of the first and second restrictions in unison, wherein the counteracting force opposes substantially between 50% and 130% of the axial flow induced force at all valve positions between the cracking point and a position of the valve wherein the axial flow induced force is one half of the axial flow induced force at the cracking point.

15. The method of claim 11 further comprising:

proportionally increasing the size of the first and second restrictions in unison.

16. The method of claim 11 further comprising translating the valve to a fully open position wherein the size of the second restriction is between 1.1 and 1.5 times of the first restriction.

17. The method of claim 11 further comprising reciprocating the valve between two positions using a solenoid to move the valve one direction and a return spring to move the valve a second direction opposite said first direction.

18. The method of claim 11 wherein the first restriction and the second restriction are separated by an axial distance of between 0 and 10 millimeters and a radial distance of between 0 and 3 millimeters.

19. The method of claim 11 wherein the step of restricting at the first restriction comprises metering the fluid flow, wherein the first restriction is smaller than the second restriction, the first restriction increasing and decreasing in unison with the second restriction as the valve linearly translates.

20. The method of claim 11 further comprising guiding the valve linearly with the first and second valve lands, the first and second valve lands being spaced apart and sliding against the axial valve chamber, the first land having the first and second restrictions.

* * * * *